United States Patent [19]

Sommer

[11] Patent Number: 5,769,187
[45] Date of Patent: Jun. 23, 1998

[54] PRESS DRIVE WITH OIL SHEAR CLUTCH/ BRAKE DRIVES

[75] Inventor: Gordon Maurice Sommer, Grosse Pointe Farms, Mich.

[73] Assignee: Midwest Brake Bond Co., Warren, Mich.

[21] Appl. No.: 671,457

[22] Filed: Jun. 27, 1996

[51] Int. Cl.⁶ ..................................................... F16D 55/36
[52] U.S. Cl. ..................... 188/71.5; 188/170; 188/264 E; 192/18 A
[58] Field of Search .................................. 188/71.5, 170, 188/166, 264 E; 192/18 A, 12 C

[56] References Cited

U.S. PATENT DOCUMENTS

| | | | |
|---|---|---|---|
| 2,242,396 | 5/1941 | Johansen | 192/18 A |
| 2,848,082 | 8/1958 | Dehn | 192/12 |
| 3,441,114 | 4/1969 | Pensa | 192/18 A X |
| 3,713,517 | 1/1973 | Sommer | 188/264 E X |
| 4,095,523 | 6/1978 | Drungil | 188/170 |
| 4,346,796 | 8/1982 | Ueno | 192/18 A |
| 4,562,907 | 1/1986 | Maeda | 192/18 A |

*Primary Examiner*—Peter M. Poon
*Attorney, Agent, or Firm*—Harness, Dickey & Pierce P.L.C.

[57] ABSTRACT

A drive unit for driving a press uses a hydraulically actuated oil shear brake unit located on one side of a flywheel and a hydraulically actuated oil shear clutch unit located on the opposite side of the flywheel. The actuating assemblies for the oil shear brake unit and the oil shear clutch unit are supplied as complete assemblies which are secured to the brake housing and clutch housing, respectively, at the time of assembly of the units to the press. The actuation of the clutch unit and the brake unit occur simultaneously and from the same hydraulic pressure source such that the overlap between the two units is controllable from no overlap to a specified amount of overlap where the brake unit is applied simultaneously with the engagement of the clutch for a specified amount of time. The stroke acquired by the brake and clutch actuating assemblies can each be selected at the time of assembly by selecting the appropriate width for a plurality of spacers.

25 Claims, 6 Drawing Sheets

PRESS DRIVE WITH OIL SHEAR CLUTCH/BRAKE DRIVES

CROSS REFERENCE TO RELATED APPLICATIONS

This application is related to PCT application Ser. No. PCT/US94/05508, filed May 13, 1994, which designated the United States of America.

FIELD OF THE INVENTION

The present invention relates to press drives. More particularly the present invention relates to a single speed press drive using an oil shear clutch unit disposed on one side of a flywheel and an oil shear brake unit disposed on the opposite side of the flywheel.

BACKGROUND OF THE INVENTION

Dry friction clutch/brakes depend upon the rubbing of a dry friction material against dry reaction members to start and stop a press. This continuous dry rubbing causes wearing of both the friction material and the reaction members as well as causing the generation of heat in these members. The faster the press operates and the faster the flywheel rotates, greater is the amount of wear and heat which are generated. This generation of wear and heat requires periodic gap adjustment between the friction plates and the reaction members to keep the clutch/brakes functioning and the press operating correctly. The trip rate or cycle speed of a press equipped with a dry friction clutch/brake unit is limited because the mass of the unit determines its heat dissipation capacity. If the mass of the unit is increased to increase its heat dissipation capacity, the inertia that must be started and stopped is also increased. These factors define a closed loop from which it is impossible to escape when trying to substantially increase the performance of the system.

Oil shear brake and clutch units have been developed to eliminate the problems associated with the dry friction type of units. The oil shear systems use hydraulic actuation instead of air actuation and the units have been developed with key modules which can be easily adapted to be mated with the various types of presses. Properly designed oil shear clutch/brake drives offer the advantage of little or no wear of plates in the disk stacks and no brake fade. This provides a more precise operation of the press and dramatically increases press up-time. The oil film between the adjacent disks carries the heat generated by the start-stops of the unit away from the disk stacks. This removal of heat offers the advantage that there is now no practical limit for the press trip rate and the flywheel speed. In addition, this removal of heat provides unlimited inching capabilities.

While these oil shear clutch/brake drive units have significantly improved the operation of the units, they have all been supplied as single units which have the clutch and brake units interfaced using various techniques for the engagement and disengagement of the clutch and for the application and release of the brake. One problem associated with these prior art oil shear clutch/brake drives has been the coordination between the operation of the brake unit and the operation of the clutch unit. Accordingly, what is needed is a press drive system which incorporates the flexibility to be applied to a wider variety of presses where size and performance are of the utmost importance. In addition, the press drive system should simplify the coordination and operation of the brake and clutch units.

SUMMARY OF THE PRESENT INVENTION

The present invention provides the art with a press drive system which uses an oil shear brake and an oil shear clutch drive. The clutch system of the present invention uses a disk stack of multiple disks and is located on one side of a flywheel. The brake system of the present invention also uses a disk stack of multiple disks and is located on the opposite side of the flywheel. The oil shear system of the present invention utilizes all the advantages associated with the oil shear technology while the separation of the brake and clutch units and placing them on opposite sides of the flywheel minimizes the amount of space required for the unit on any single side of the flywheel. This combination provides a unique oil shear clutch/brake unit which can be assembled to any press drive system utilizing a minimum amount of space. In addition, the separation of the two units provides the flexibility to design into the units the coordination between the operation of the brake unit and the operation of the clutch unit.

Other advantages and objects of the present invention will become apparent to those skilled in the art from the subsequent detailed description, appended claims and drawings.

BRIEF DESCRIPTION OF THE DRAWING

In the drawings which illustrate the best mode presently contemplated for carrying out the present invention.

DETAILED DESCRIPTION OF THE PREFERRED EMBODIMENT

Figure 1:
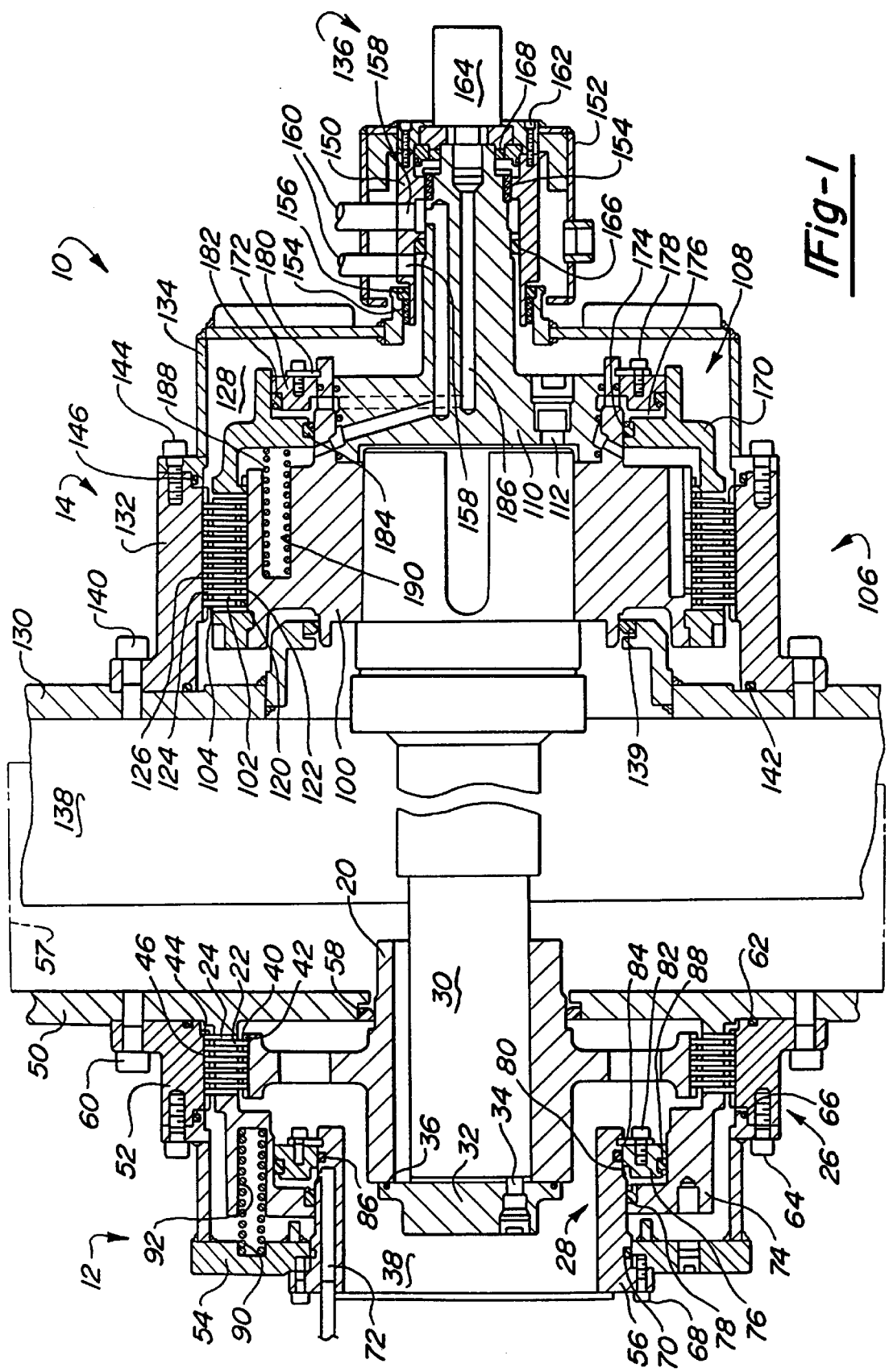
FIG. 1 is a side view, partially in cross section, of a brake and clutch unit in accordance with the present invention located on opposite sides of a flywheel.

Referring now to the drawings, in which like reference numerals designate like or corresponding parts throughout the several views, there is shown in FIG. 1 a brake and clutch unit in accordance with the present invention which is designated generally by the reference numeral 10. The embodiment described below is being described for exemplary purposes only. The unique brake and clutch assemblies of the present invention can be incorporated into other designs of press drives if desired.

Referring now to FIG. 1, the brake and clutch unit 10 includes a separate brake assembly 12 and a clutch assembly 14. Brake assembly 12 includes a brake reaction hub 20, a plurality of brake friction plates 22, a plurality of brake reaction plates 24, a brake housing assembly 26 and a brake engagement assembly 28. Brake reaction hub 20 is drivingly connected to a drive shaft 30 of the press to which clutch/brake apparatus 10 is being attached. An end cap 32 is fixedly secured to drive shaft 30 using a plurality of bolts 34. A seal 36 disposed between hub 20 and end cap 32 helps to maintain an oil tight chamber 38 within housing assembly 26 as will be described later herein. Chamber 38 is supplied with cooling oil for oil shear brake assembly 12 by methods known well in the art.

The plurality of brake friction plates 22 have spline means 40 located on their interior surface for engagement with spline means 42 disposed on the exterior of hub 20. This spline engagement between plates 22 and hub 20 is such that plates 22 and hub 20 will rotate together but plates 22 are allowed to move axially along spline means 42. Interjected or interleaved between the plurality of brake friction plates 22 are the plurality of brake reaction plates 24. Brake reaction plates 24 have spline means 44 located on their exterior surface for the engagement with spline means 46 disposed on the interior of housing assembly 26. The engagement between plates 24 and housing assembly 26 is such that plates 24 are prohibited from rotating with respect to housing assembly 26 but plates 24 are allowed to move axially along spline means 46 of housing assembly 26.

Housing assembly 26 in conjunction with brake reaction hub 20 defines sealed chamber 38. Housing assembly 26 includes a brake ring adapter plate 50, a brake reaction member 52, a housing cover 54 and a housing cap 56. Adapter plate 50 is fixedly secured to the frame or a stationary member 57 of the press or any other non-moving member adjacent to the press. A seal 58 located between adapter plate 50 and brake reaction hub 20 maintains the oil tightness of chamber 38.

Brake reaction member 52 is fixedly and sealingly secured to adapter plate 50 with a plurality of bolts 60 or by other means known well in the art. A seal 62 between plate 50 and reaction member 52 maintains the oil tightness of chamber 38. Reaction member 52 includes spline means 46, and positions spline means 46 generally co-axial with spline means 42 such that plates 24 and plates 22 are positioned in their interleaved relationship. Housing cover 54 is fixedly and sealingly secured to reaction member 52 using a plurality of bolts 64 or by other means known well in the art. A seal 66 between cover 54 and reaction member 52 maintains the oil tightness of chamber 38. For exemplary purposes, housing cover 54 is shown in FIG. 1 as being comprised of multiple pieces welded together. Housing cap 56 is fixedly and sealing secured to cover 54 by a plurality of bolts 68. A seal 70 between cap 56 and cover 54 maintains the oil tightness of chamber 38. For exemplary purposes, housing cap 56 is shown in FIG. 1 as being a multiple piece assembly. A fluid passage 72 extends through housing cap 56 to provide for the application and release of brake assembly 12 as will be described later herein.

Brake engagement assembly 28 is disposed within sealed chamber 38 defined by housing assembly 26 and brake reaction hub 20. Brake engagement assembly 28 comprises an application member 74 and an annular stationary plate 76. Application member 74 is slidingly received over housing cover 56 and moves axially along cover 56 in order to apply or release brake assembly 12. A seal 78 is disposed between cover 56 and application member 74 in order to isolate an activation chamber 80 from chamber 38. Stationary plate 76 is disposed between cover 56 and application member 74, and with member 74 and cover 56 define chamber 80. Stationary plate 76 is fixedly secured to cover 56 using a plurality of bolts 82 and a plurality of retainers 84. A seal 86 is disposed between plate 76 and cover 56 to isolate chamber 80 from chamber 38. A second seal 88 is disposed between plate 76 and application member 74 to complete the isolation of chamber 80 from chamber 38. Chamber 80 is isolated from chamber 38 with the only access to chamber 80 being through passage 72. A plurality of coil springs 90 are disposed within a plurality of bores 92 extending into application member 74. Springs 90 extend between housing cover 54 and application member 74 in order to urge brake assembly 12 into the applied condition.

The operation of brake assembly 12 begins with brake assembly 12 being in the applied condition due to the biasing of application member 74 by the plurality of coil springs 90. Application member 74 compresses the plurality of friction plates 22 and the plurality of reaction plates 24 together and against adapter plate 50. In this applied condition, rotation of driveshaft 30 is prohibited by the fact that brake reaction hub 20, which is locked to driveshaft 30, is locked to adapter plate 50 which is in turn secured to stationary member 57. When it is desired to release brake assembly 12, fluid under pressure is supplied to chamber 80 through passage 72. Pressurized fluid within chamber 80 causes application member 74 to move axially to the left as shown in FIG. 1 against the biasing of coil springs 90. When application member 74 moves to the left, the compression between the plurality of friction and reaction plates 22 and 24, respectively, is released and plates 22 are free to rotate relative to plates 24 which allows driveshaft 30 to rotate. When the pressurized fluid is released from chamber 80, brake assembly 12 is again urged into its applied condition due to the biasing of coil springs 90.

Clutch assembly 14 includes a clutch reaction hub 100, a plurality of clutch friction plates 102, a plurality of clutch reaction plates 104, a clutch housing assembly 106 and a clutch engagement assembly 108. Clutch reaction hub 100 is drivingly connected to drive shaft 30 of the press to which clutch/brake apparatus 10 is being attached. An end cap 110 is fixedly secured to driveshaft 30 using a plurality of bolts 112. End cap 110 extends through clutch housing assembly 106 to provide access for the attachment of the various fluid lines required for the operation of clutch/brake assembly 10 as will be described later herein.

The plurality of clutch friction plates 102 have spline means 120 located on their interior surface for the engagement with spline means 122 located on the exterior surface of hub 100. This spline engagement between plates 102 and hub 100 is such that plates 102 and hub 100 will rotate together but plates 102 are allowed to move axially along spline means 122. Interjected or interleaved between the plurality of clutch friction plates 102 are the plurality of clutch reaction plates 104. Clutch reaction plates 104 have spline means 124 located on their exterior surface for the engagement with spline means 126 disposed on the interior of housing assembly 106. The engagement between plates 104 and housing assembly 106 is such that plates 104 are prohibited from rotating with respect to housing assembly 106 but plates 104 are allowed to move axially along spline means 126 of housing assembly 106.

Housing assembly 106 in conjunction with reaction hub 20 defines a sealed chamber 128. Housing assembly 106 includes a flywheel adapter plate 130, a clutch reaction member 132, a housing cover 134 and a housing cap assembly 136. Adapter plate 130 is fixedly secured to a flywheel 138 of the press to which brake/clutch assembly 10 is being attached. A seal 139 located between adapter plate 130 and clutch reaction hub 100 maintains the oil tightness of chamber 128.

Clutch reaction member 132 is fixedly and sealingly secured to adapter plate 130 by a plurality of bolts 140 or by other means known well in the art. A seal 142 between plate 130 and reaction member 132 maintains the oil tightness of chamber 128. Reaction member 132 includes spline means 126, and positions spline means 126 generally co-axial with spline means 122 such that plates 104 and plates 102 are positioned in their interleaved relationship. Housing cover 134 is fixedly and sealingly secured to reaction member 132 using a plurality of bolts 144 or by other means known well in the art. A seal 146 between cover 134 and reaction member 132 maintains the oil tightness of chamber 128. For exemplary purposes, housing cover 134 is shown in FIG. 1 as being comprised of multiple pieces welded together.

Housing cap assembly 136 is rotatably supported by end cap 110 of clutch assembly 14 and comprises a center hub 150 for interfacing with end cap 110 and a protective cover 152. Center hub 150 is rotatably supported on end cap 110 and housing cover 134 by a pair of bearings 154. A of seal 156 maintains the oil tightness of chamber 128. A pair of ports 158 extend through center hub 150 to provide for the attachment of fluid lines 160 which allow for the entrance and exit of oil to oil shear clutch assembly 14. Protective cover 152 is fixedly secured to center hub 150 by a plurality of bolts 162 or by other means known well in the art. Cover 152 provides for the connection of a fluid line 164 for the engagement and release of clutch assembly 14 as will be described later herein. A seal 166 located between cover 152 and center hub 150, and a seal 168 located between cover 152 and end cap 110 maintain the oil tightness of chamber 128.

Clutch engagement assembly 108 is disposed within sealed chamber 128 defined by housing 106 and clutch reaction hub 100. Clutch engagement assembly 108 comprises an application member 170 and an annular stationary plate 172. Application member 170 is slidingly received over hub 100 and moves axially along hub 100 in order to engage and release clutch assembly 14. A seal 174 is disposed between hub 100 and application member 170 in order to isolate an activation chamber 176 from chamber 128. Stationary plate 172 is disposed between hub 100 and application member 170, and with member 170 and hub 100 define chamber 176. Stationary plate 172 is fixedly secured to hub 100 using a plurality of bolts 178 and a plurality of retainers 180. A seal 182 is disposed between plate 172 and application member 170 to isolate chamber 176 from chamber 128. A second seal 184 is disposed between plate 172 and hub 100 to complete the isolation of chamber 176 from chamber 128. Chamber 176 is isolated from chamber 128 with the only access to chamber 176 being through a passage 186 extending through end cap 110 to connect chamber 176 with fluid line 164 which extends through cover 152. A plurality of coil springs 188 are disposed within a plurality of bores 190 extending into hub 100. Springs 188 extend between hub 100 and application member 170 in order to urge clutch assembly 14 into a disengaged condition.

The operation of clutch assembly 14 begins with clutch assembly 14 being in the disengaged condition due to the biasing of application member 170 by the plurality of coil springs 188 to cause application member 170 to move away from friction plates 102 and reaction plates 104. In this released position, flywheel 138 is free to rotate with respect to driveshaft 30 due to the fact that the plurality of friction plates 102 are free to rotate relative to the plurality of reaction plates 104. When it is desired to power driveshaft 30 by flywheel 138, fluid under pressure is supplied to chamber 176 through passage 186. Pressurized fluid within chamber 176 causes application member 170 to move axially to the left as shown in FIG. 1 against the biasing of coil springs 188. When application member 170 moves to the left, the plurality of friction plates 102 are urged against the plurality of reaction plates 104 causing engagement of clutch assembly 14 and the transferring of power from flywheel 138 to drive driveshaft 30. When the pressurized fluid is released from chamber 176, clutch assembly 14 is again urged into its disengaged condition due to the biasing of coil springs 188.

Brake assembly 12 operates to stop driveshaft 30 from rotating with respect to flywheel 138 and clutch assembly 14 operates to cause driveshaft 30 to be rotated by flywheel 138. Because these operations are opposite to each other, it is necessary to coordinate the application and release of brake assembly 12 with the engagement and disengagement of clutch assembly 14 to insure that there is no overlap between the two assemblies. The present invention provides the unique coordination of operation of brake assembly 12 and clutch assembly 14 by designing the two assemblies 12 and 14 such that the coordination of their operation are designed into the assemblies. In one embodiment, the plurality of coil springs 90 and the plurality of coil springs 188 are designed to be generally identical in strength and number. Thus the urging force that applies brake assembly 12 and the urging force that disengages clutch assembly 14 is generally identical. In addition, the size and dimensions of chamber 80 are generally identical to the size and dimensions of chamber 176. Thus when the same pressurized fluid is supplied to both chambers 80 and 176 simultaneously, brake assembly 12 will release simultaneously to the engagement of clutch assembly 14. In a similar manner, the disengagement of clutch assembly 14 and the application of brake assembly 12 will also occur simultaneously with the simultaneous release of pressurized fluid from chambers 80 and 176 and the reaction caused by springs 90 and 188. This eliminates the overlap between brake assembly 12 and clutch assembly 14 without the need for mechanically interlocking the two assemblies.

In another embodiment, the plurality of coil springs 90 and the plurality of coil springs 188 are designed to be different in number and/or different in strength. Thus the urging force that applies brake assembly 12 and the urging force that disengages clutch assembly 14 will be different. In order to maintain the commonization of components, the size and dimensions of chamber 80 are left generally identical to the size and dimensions of chamber 176 although this is not a requirement. Thus when the same pressurized fluid is supplied to both chambers 80 and 176 simultaneously, brake assembly 12 will release either prior to or after the engagement of clutch assembly 14. Normally, the release of brake assembly 12 is designed to be after the engagement of clutch assembly 14 to provide a specified amount of overlap between the two assemblies. In a similar manner, the disengagement of clutch assembly 14 and the application of brake assembly 12 will not occur simultaneously with the simultaneous release of pressurized fluid from chambers 80 and 176 and the reaction caused by springs 90 and 188. Normally, the application of brake assembly 12 is designed to be before the disengagement of clutch assembly 14 to again provide a specific amount of overlap between the two assemblies. Thus, a specified amount of overlap can be designed into the assemblies without the need of mechanically interlocking the two assemblies.

Figure 2:
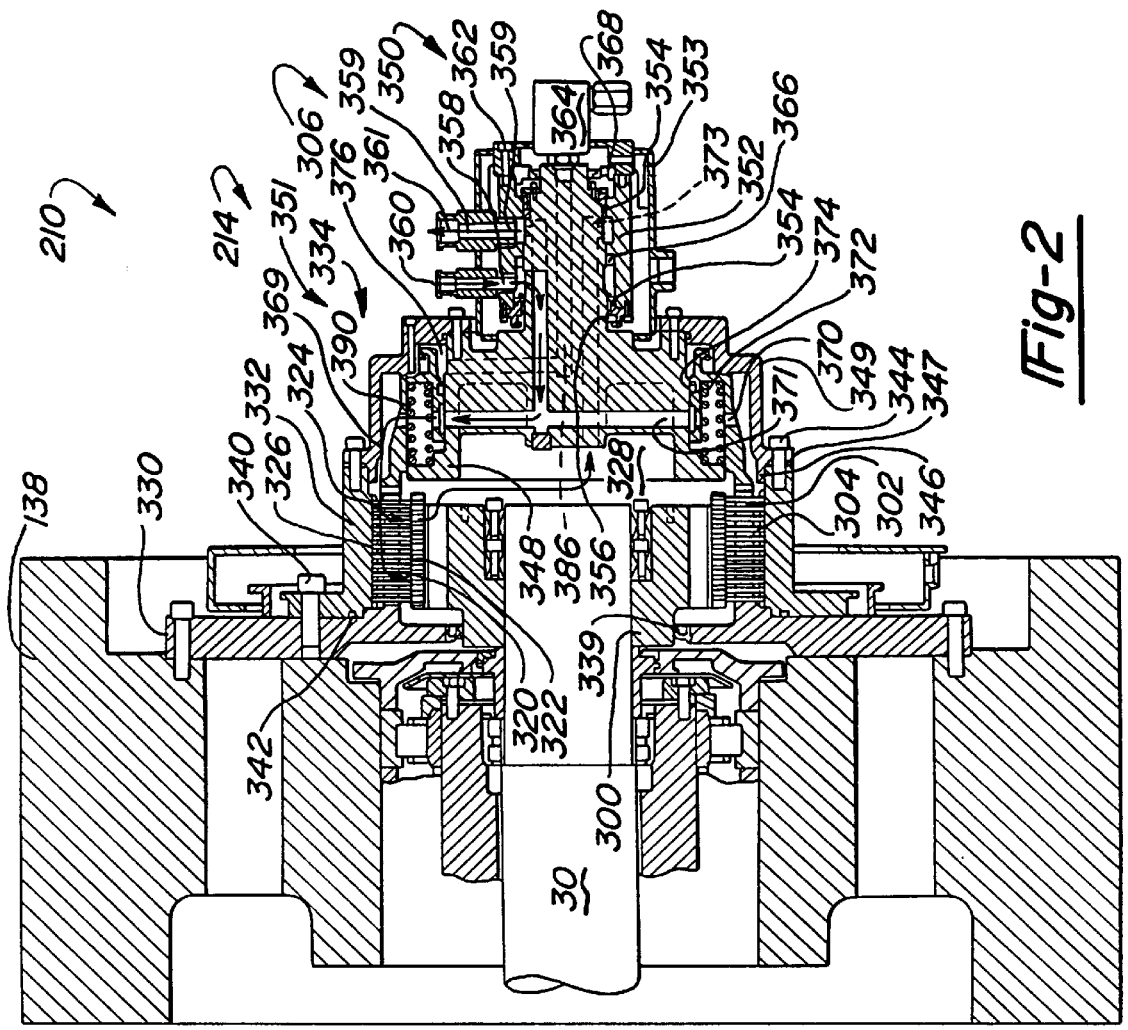
FIG. 2 is a side view, partially in cross-section, of a brake and clutch unit in accordance with another embodiment of the present invention.
Figure 2:
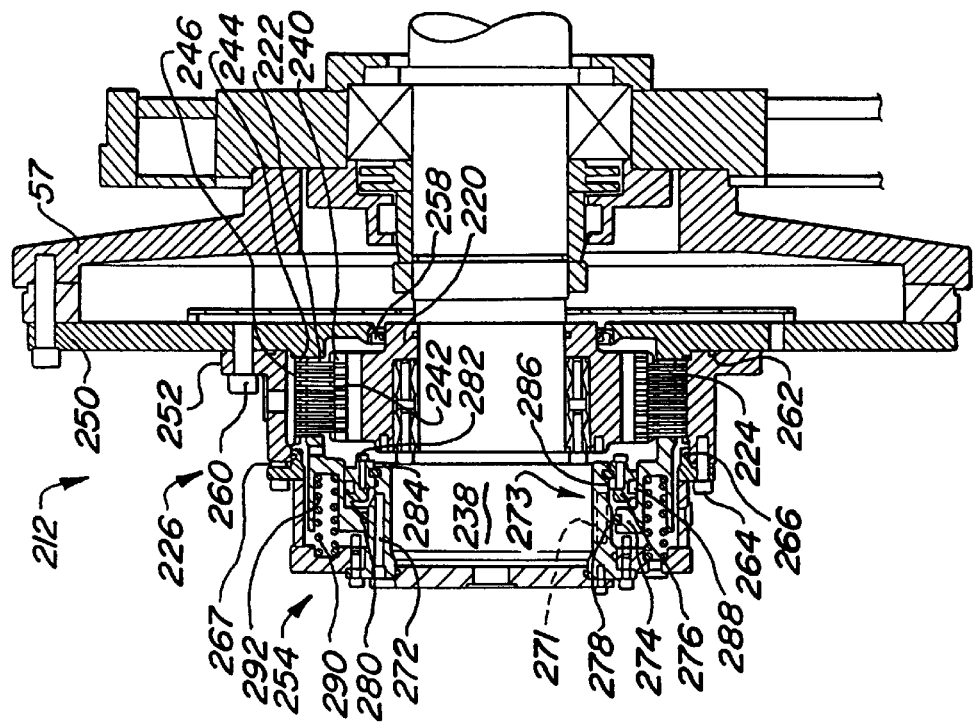

Referring to FIG. 2, there is shown a brake and clutch unit in accordance with another embodiment of the present invention which is designated generally by the reference numeral 210. Brake and clutch unit 210 is similar to brake and clutch unit 10 but it has been redesigned to provide for the commonization of components between various press manufacturers to simplify the manufacture and assembly of the units.

Referring now to FIG. 2, the brake and clutch unit 210 includes a separate brake assembly 212 and a clutch assembly 214. Brake assembly 212 includes a brake reaction hub 220, a plurality of brake friction plates 222, a plurality of brake reaction plates 224 and a brake housing assembly 226. Brake reaction hub 220 is drivingly connected to drive shaft 30 of the press to which clutch/brake apparatus 210 is being attached. Brake assembly 212 defines an internal oil tight chamber within housing assembly 226 to provide lubrication for the various components of brake assembly 212 as well as for supplying cooling oil for oil shear brake assembly 12.

The plurality of brake friction plates 222 have spline means 240 located on their interior surface for engagement with spline means 242 disposed on the exterior of hub 220. This spline engagement between plates 222 and hub 220 is such that plates 222 and hub 220 will rotate together but plates 222 are allowed to move axially along spline means 242. Interjected or interleaved between the plurality of brake friction plates 222 are the plurality of brake reaction plates 224. Brake reaction plates 224 have spline means 244 located on their exterior surface for the engagement with spline means 246 disposed on the interior of housing assembly 226. The engagement between plates 224 and housing assembly 226 is such that plates 224 are prohibited from rotating with respect to housing assembly 226 but plates 224 are allowed to move axially along spline means 246 of housing assembly 226. Housing assembly 226 in conjunction with brake reaction hub 220 defines a sealed chamber 238. Housing assembly 226 includes a brake ring adapter plate 250, a brake reaction member 252 and an actuator assembly 254. Adapter plate 250 is fixedly secured to the frame or a stationary member 57 of the press or any other non-moving member adjacent to the press. A seal 258 located between adapter plate 250 and brake reaction hub 220 maintains the oil tightness of chamber 238.

Brake reaction member 252 is fixedly and sealingly secured to adapter plate 250 with a plurality of bolts 260 or by other means known well in the art. A seal 262 between plate 250 and reaction member 252 maintains the oil tightness of chamber 238. Reaction member 252 includes spline means 246, and positions spline means 246 generally co-axial with spline means 242 such that plates 224 and plates 222 are positioned in their interleaved relationship. Actuator assembly 254 is fixedly and sealingly secured to reaction member 252 using a plurality of bolts 264 or by other means known well in the art. A seal 266 between actuator assembly 254 and reaction member 252 maintains the oil tightness of chamber 238. A plurality of spacers 267 are located between actuator assembly 254 and reaction member 252 to properly position actuator assembly 254 with respect to plate 250, plates 222 and plates 224. A fluid passage 272 extends through actuator assembly 254 to provide for the application and release of brake assembly 212 as will be described later herein.

Actuator assembly 254 includes a brake housing 271 and a brake engagement assembly 273. Brake engagement assembly 273 comprises an application member 274 and an annular stationary plate 276. Application member 274 is slidingly received over brake housing 271 and moves axially along housing 271 in order to apply or release brake assembly 212. A seal 278 is disposed between housing 271 and application member 274 in order to isolate an activation chamber 280 from chamber 238. Stationary plate 276 is disposed between housing 271 and application member 274, and with member 274 and housing 271 define chamber 280. Stationary plate 276 is fixedly secured to housing 271 using a plurality of bolts 282 and a plurality of retainers 284. A seal 286 is disposed between plate 276 and housing 271 to isolate chamber 280 from chamber 238. A second seal 288 is disposed between plate 276 and application member 274 to complete the isolation of chamber 280 from chamber 238. Chamber 280 is isolated from chamber 238 with the only access to chamber 280 being through passage 272. A plurality of coil springs 290 are disposed within a plurality of bores 292 extending into application member 274. Springs 290 extend between housing 271 and application member 274 in order to urge brake assembly 212 into the applied condition.

The operation of brake assembly 212 begins with brake assembly 212 being in the applied condition due to the biasing of application member 274 by the plurality of coil springs 290. Application member 274 compresses the plurality of friction plates 222 and the plurality of reaction plates 224 together and against adapter plate 250. In this applied condition, rotation of driveshaft 30 is prohibited by the fact that brake reaction hub 220, which is locked to driveshaft 30, is locked to adapter plate 250 which is in turn secured to stationary member 57. When it is desired to release brake assembly 212, fluid under pressure is supplied to chamber 280 through passage 272. Pressurized fluid within chamber 280 causes application member 274 to move axially to the left as shown in FIG. 2 against the biasing of coil springs 290. When application member 274 moves to the left, the compression between the plurality of friction and reaction plates 222 and 224, respectively, is released and plates 222 are free to rotate relative to plates 224 which allows driveshaft 30 to rotate. When the pressurized fluid is released from chamber 280, brake assembly 212 is again urged into its applied condition due to the biasing of coil springs 290.

Clutch assembly 214 includes a clutch reaction hub 300, a plurality of clutch friction plates 302, a plurality of clutch reaction plates 304 and a clutch housing assembly 306. Clutch reaction hub 300 is drivingly connected to drive shaft 30 of the press to which clutch/brake apparatus 210 is being attached.

The plurality of clutch friction plates 302 have spline means 320 located on their interior surface for the engagement with spline means 322 located on the exterior surface of hub 300. This spline engagement between plates 302 and hub 300 is such that plates 302 and hub 300 will rotate together but plates 302 are allowed to move axially along spline means 322. Interjected or interleaved between the plurality of clutch friction plates 302 are the plurality of clutch reaction plates 304. Clutch reaction plates 304 have spline means 324 located on their exterior surface for the engagement with spline means 326 disposed on the interior of housing assembly 306. The engagement between plates 304 and housing assembly 306 is such that plates 304 are prohibited from rotating with respect to housing assembly 306 but plates 304 are allowed to move axially along spline means 326 of housing assembly 306.

Housing assembly 306 in conjunction with reaction hub 300 defines a sealed chamber 328. Housing assembly 306 includes a flywheel adapter plate 330, a clutch drive ring 332 and an actuator assembly 334. Adapter plate 330 is fixedly secured to a flywheel 138 of the press to which brake/clutch assembly 210 is being attached. A seal 339 located between adapter plate 330 and clutch reaction hub 300 maintains the oil tightness of chamber 328.

Clutch drive ring 332 is fixedly and sealingly secured to adapter plate 330 by a plurality of bolts 340 or by other means known well in the art. A seal 342 between plate 330 and drive ring 332 maintains the oil tightness of chamber 328. Drive ring 332 includes spline means 326, and positions spline means 326 generally co-axial with spline means 322 such that plates 304 and plates 302 are positioned in their interleaved relationship. Actuator assembly 334 is fixedly and sealingly secured to drive ring 332 using a plurality of bolts 344 or by other means known well in the art. A seal 346 between actuator assembly 334 and drive ring 332 maintains the oil tightness of chamber 328. A plurality of spacers 347 are located between actuator assembly 334 and drive ring 332 to properly position actuator assembly 334 with respect to plate 330, plates 302 and plates 304. Actuator assembly 334 includes an internal housing 348, an external housing 349, a housing cap assembly 350 and a clutch engagement assembly 351.

Housing cap assembly 350 is rotatably supported by internal housing 348 and comprises a center hub 352 for interfacing with internal housing 348 and a protective cover 353. Center hub 352 is rotatably supported on internal housing 348 and external housing 349 by a pair of bearings 354. A seal 356 maintains the oil tightness of chamber 328. An inlet port 358 and an outlet port 359 extend through center hub 352 to provide for the attachment of fluid lines 360 and 361, respectively, which allow for the entrance and exit of oil for oil shear clutch assembly 214. Protective cover 253 is fixedly secured to center hub 352 by a plurality of bolts 362 or by other means known well in the art. Cover 353 provides for the connection of a fluid line 364 for the engagement and release of clutch assembly 214 as will be described later herein. A seal 366 located between cover 353 and center hub 352, and a seal 368 located between cover 353 and internal housing 348 maintain the oil tightness of chamber 328.

The oil flow for clutch assembly 214 is illustrated by arrows 369. Oil enters chamber 328 through fluid line 360 and inlet port 358 and this oil is directed to the outside portion of chamber 328 by an oil passage 371. The oil proceeds through plates 302 and 304 to provide the oil for the oil shear operation of clutch assembly 214 and the removal of heat from plates 302 and 304. The oil continues to the inside portion of chamber 328 to an oil passage 373 which mates with outlet port 359 and the oil is removed from clutch assembly 214 by fluid line 361.

The direction of the oil flow for the present invention is opposite to the direction of fluid flow normally utilized in the prior art. Prior art lubrication systems supply oil to the inside portion of the clutch and subsequently remove the oil from the outside portion of the clutch. The rotation of the clutch and the associated centrifugal force for the oil which is produced in the prior art clutches is in the direction of flow of the oil. Thus, there is a tendency in the prior art to increase the flow rate of the oil. Thus, should there be a momentary delay in the supply of oil to the inside portion of the prior art clutch, the friction plates which are located on the outside portion of the clutch would be momentarily starved of oil. This oil starving will result in the generation of heat and excessive wear between the plates.

The present invention by reversing the direction for the flow of the oil resolves prior art problems associated with momentary delay in the supply of oil, producing an unexpected increase in the performance of clutch assembly 214. The centrifugal force created by the rotation of clutch assembly 214 will impede the oil flow of the present invention because oil is fed to the outside of chamber 328 and oil is removed from the inside of chamber 328. The supply of oil to the outside of chamber 328 in combination with the centrifugal force produced by the rotation of clutch assembly 214 will tend to keep the oil in the outside portion of chamber 328 in contact with plates 302 and 304. Thus, any momentary delay in the supply in oil will not starve clutch assembly 214 and plates 302 and 304 will remain bathed in oil. In addition, any "hot spots" which may be created between adjacent plates 302 and 304 will increase the temperature of the oil in that localized area making this higher temperature oil lighter and thus less affected by centrifugal force. This lighter oil will tend to migrate to the inside of chamber 328. The cooler, heavier oil will be forced by centrifugal force to the outside of chamber 328 and into contact with plates 302 and 304 increasing the cooling rate for the developed "hot spot."

Clutch engagement assembly 351 is disposed within sealed chamber 328 defined by housing assembly 306 and clutch reaction hub 300. Clutch engagement assembly 351 comprises an application member 370 and a plurality of coil springs 372. Application member 370 is slidingly received over internal housing 348 and moves axially along internal housing 348 in order to engage and release clutch assembly 214. A seal 374 is disposed between internal housing 348 and application member 370 in order to isolate an activation chamber 376 from chamber 328. Application member 370 with external housing 349 and internal housing 348 define a chamber 376. Chamber 376 is isolated from chamber 328 with the only access to chamber 376 being through a passage 386 extending through internal housing 348 to connect chamber 376 with fluid line 364 which extends through cover 353. The plurality of coil springs 372 are disposed within a plurality of bores 390 extending into application member 370. Springs 388 extend between internal housing 348 and application member 370 in order to urge clutch assembly 214 into a disengaged condition.

The operation of clutch assembly 214 begins with clutch assembly 214 being in the disengaged condition due to the biasing of application member 370 by the plurality of coil springs 388 to cause application 370 to move away from friction plates 302 and reaction plates 304. In this released position, flywheel 138 is free to rotate with respect to driveshaft 30 due to the fact that the plurality of friction plates 302 are free to rotate relative to the plurality of reaction plates 304. When it is desired to power driveshaft 30 by flywheel 138, fluid under pressure is supplied to chamber 376 through passage 386. Pressurized fluid within chamber 376 causes application member 370 to move axially to the left as shown in FIG. 2 against the biasing of coil springs 388. When application member 370 moves to the left, the plurality of friction plates 302 are urged against the plurality of reaction plates 304 causing engagement of clutch assembly 214 and the transferring of power from flywheel 138 to drive driveshaft 30. When the pressurized fluid is released from chamber 376, clutch assembly 214 is again urged into its disengaged condition due to the biasing of coil springs 388.

Brake assembly 212 operates to stop driveshaft 30 from rotating with respect to flywheel 138 and clutch assembly 214 operates to cause driveshaft 30 to be rotated by flywheel 138. Because these operations are opposite to each other, it is necessary to coordinate the application and release of brake assembly 212 with the engagement and disengagement of clutch assembly 214 to insure that there is no overlap between the two assemblies. The present invention provides the unique coordination of operation of brake assembly 212 and clutch assembly 214 by designing the two assemblies 212 and 214 such that the coordination of their operation are designed into the assemblies. In one embodiment, the plurality of coil springs 290 and the plurality of coil springs 388 are designed to be generally identical in strength and number. Thus the urging force that applies brake assembly 212 and the urging force that disengages clutch assembly 214 is generally identical. In addition, the size and dimensions of chamber 280 are generally identical to the size and dimensions of chamber 376. Thus when the same pressurized fluid is supplied to both chambers 280 and 376 simultaneously, brake assembly 212 will release simultaneously to the engagement of clutch assembly 214. In a similar manner, the disengagement of clutch assembly 214 and the application of brake assembly 212 will also occur simultaneously with the simultaneous release of pressurized fluid from chambers 280 and 376 and the reaction caused by springs 290 and 388. This eliminates the overlap between brake assembly 212 and clutch assembly 214 without the need for mechanically interlocking the two assemblies.

In another embodiment, the plurality of coil springs 290 and the plurality of coil springs 388 are designed to be different in number and/or different in strength. Thus the urging force that applies brake assembly 212 and the urging force that disengages clutch assembly 214 will be different. In order to maintain the commonization of components, the size and dimensions of chamber 280 are left generally identical to the size and dimensions of chamber 376 although this is not a requirement. Thus when the same pressurized fluid is supplied to both chambers 280 and 376 simultaneously, brake assembly 212 will release either prior to or after the engagement of clutch assembly 214. Normally, the release of brake assembly 212 is designed to be after the engagement of clutch assembly 214 to provide a specified amount of overlap between the two assemblies. In a similar manner, the disengagement of clutch assembly 214 and the application of brake assembly 212 will not occur simultaneously with the simultaneous release of pressurized fluid from chambers 280 and 376 and the reaction caused by springs 290 and 388. Normally, the application of brake assembly 212 is designed to be before the disengagement of clutch assembly 214 to again provide a specific amount of over lap between the two assemblies. Thus, a specified amount of overlap can be designed into the assemblies without the need of mechanically interlocking the two assemblies.

As shown in FIGS. 3 through 6, the design of brake and clutch unit 210 allows for the communication of components between presses. This leads to the simplification of manufacture and assembly as well as the reduction in costs of the units. The only components which have to be designed for a specific press are adapter plates 250 and 330; brake reaction hub 220 and clutch reaction hub 300. The remaining components, including brake friction plates 222, brake reaction plates 224, brake reaction member 252, brake actuator assembly 254, clutch friction plates 302, clutch reaction plates 304, clutch drive ring 332 and clutch actuator assembly 334, are identical for all similarly sized presses.

Figure 3:
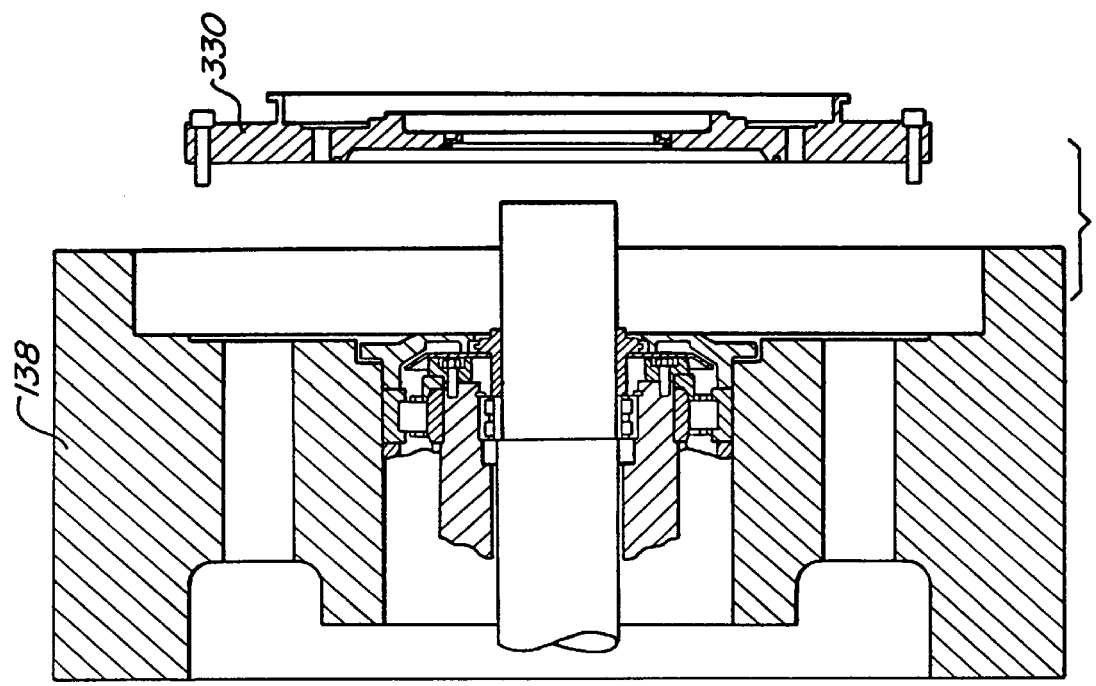
FIG. 3 is an exploded view, partially in cross section of the first installation step for the brake and clutch unit shown in FIG. 2.
Figure 3:
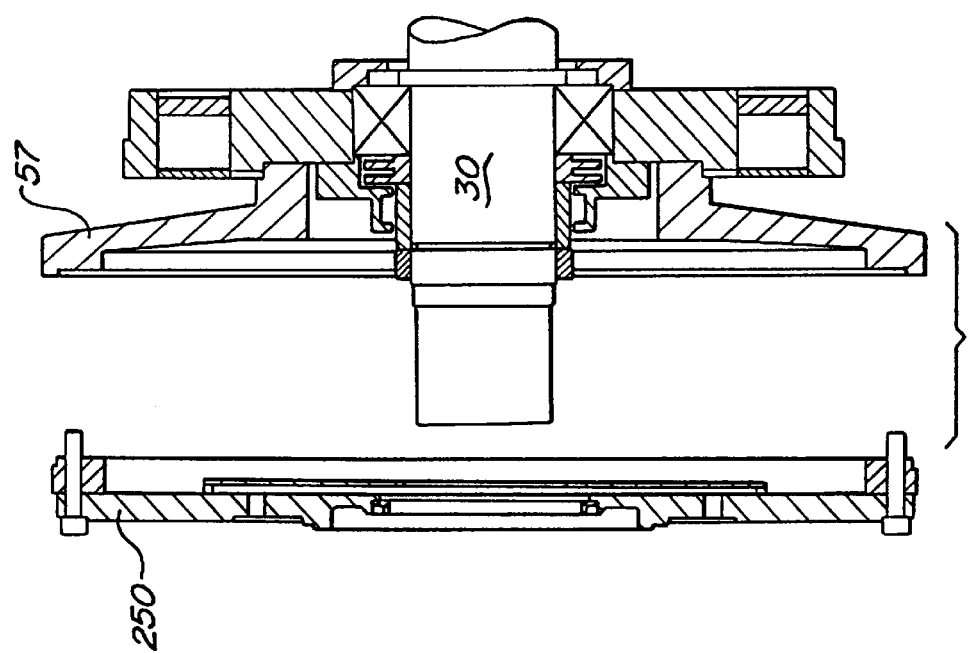
Figure 4:
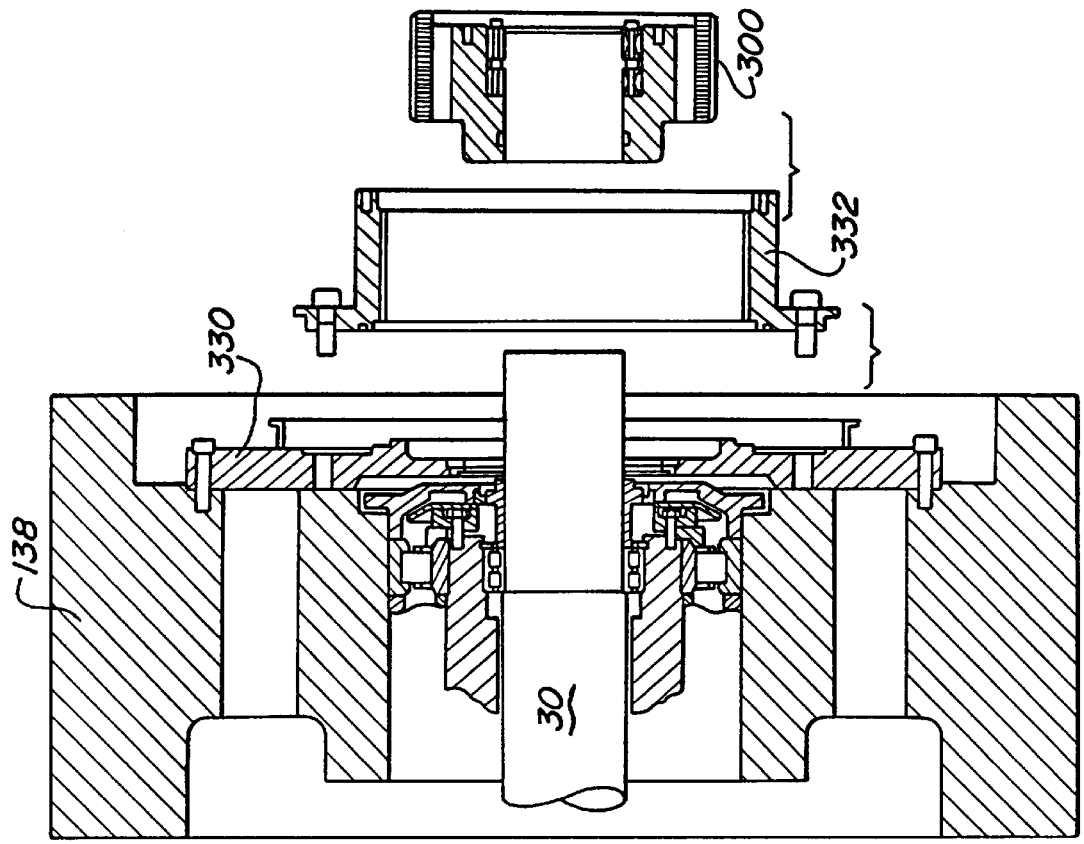
FIG. 4 is an exploded view, partially in cross section of the second installation step for the brake and clutch unit shown in FIG. 2.
Figure 4:
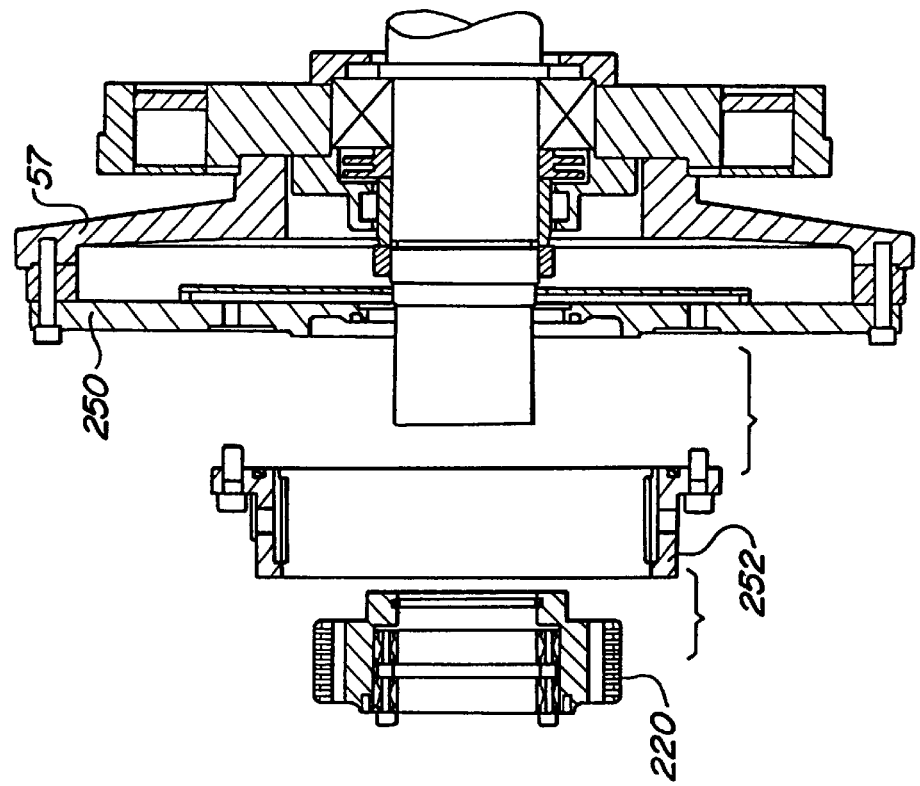
Figure 5:
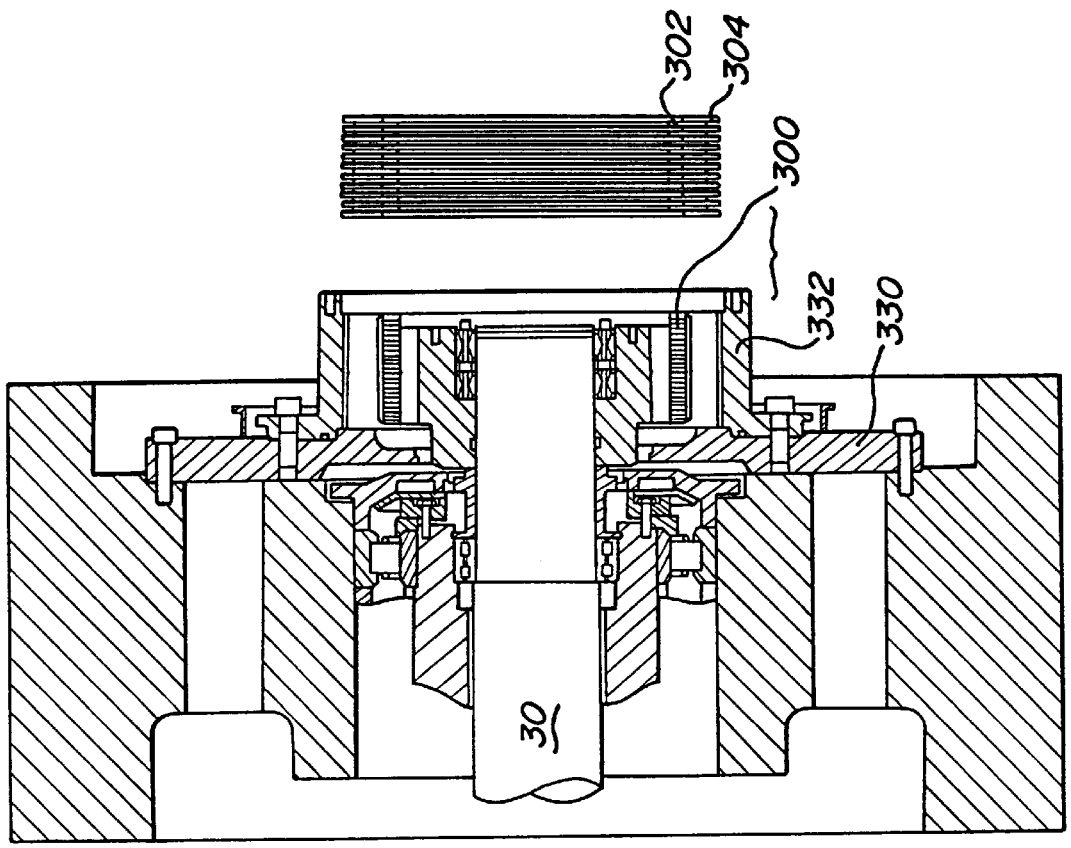
FIG. 5 is an exploded view, partially in cross section of the third installation step for the brake and clutch unit shown in FIG. 2.
Figure 6:
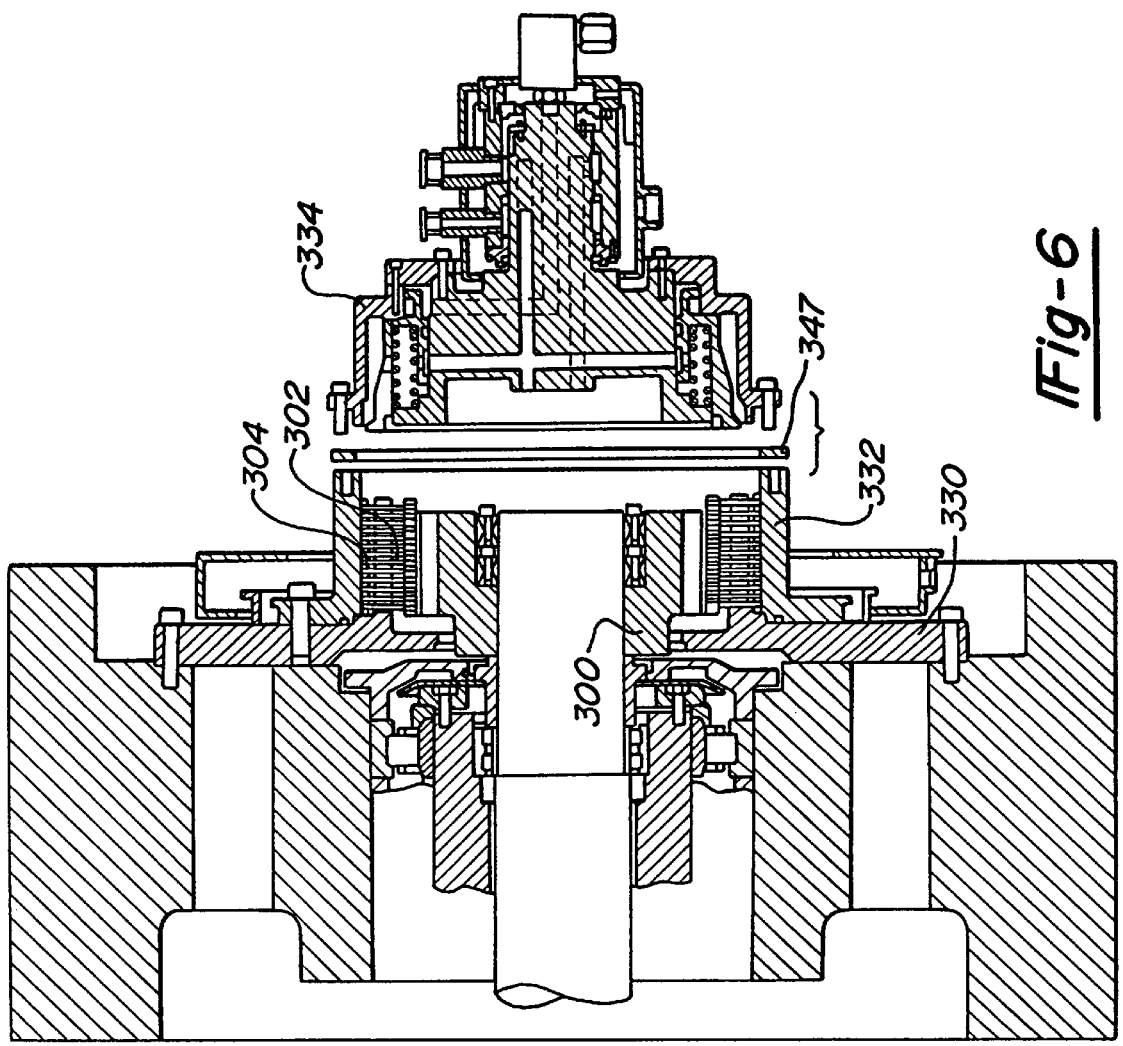
FIG. 6 is an exploded view, partially in cross section of the final installation step for the brake and clutch unit shown in FIG. 2.
Figure 6:
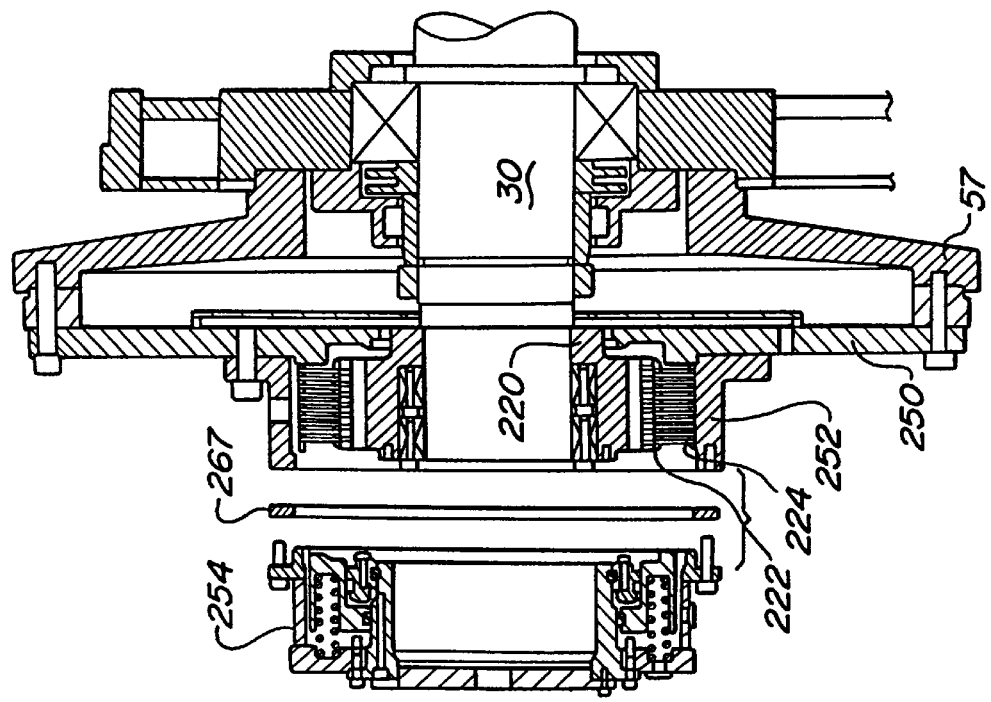

The assembly of brake and clutch unit 210 to the press begins by first attaching brake adaptor plate 250 to stationary member 57 such as the brake ring of the press and clutch adapter plate 330 to flywheel 138 of the press as shown in FIG. 3. These two components are designed for a specific press. Next, brake reaction hub 220 and clutch reaction hub 300 are attached to driveshaft 30 as shown in FIG. 4. These two components are also designed for a specific press. Also shown in FIG. 4 is the attachment of brake reaction member 252 to brake adaptor plate 250 and clutch drive ring 332 to clutch reaction hub 300. These two components are identical for all presses of similar size. Next, friction plates 222 and reaction plates 224 are assembled to brake reaction hub 220 and brake reaction member 252; and friction plates 302 and reaction plates 304 are assembled to clutch reaction hub 300 as shown in FIG. 5. The friction and reaction plates are identical for all presses of similar size. Finally, brake actuator assembly 254 is attached to brake reaction member 252 and clutch actuator assembly 334 is attached to clutch drive ring 332 as shown in FIG. 6. Spacers 267 located between brake actuator assembly 254 and brake reaction member 252 accurately set the clearances required within brake assembly 212 for its proper operation. Due to the commonization of components, the required thickness of spacers 267 are known prior to the assembly of unit 10 to the press, thus eliminating the need for custom fitting the assembly at the time of fitting it to the press. Thus, spacers 267 control the clearances between friction plates 222 and reaction plates 224 and these clearances determine the stroke required for the operation of brake assembly 212. By selecting different thicknesses for spacers 267, the stroke of assembly 212 can be selected. In a similar manner, spacers 347 located between clutch actuator assembly 334 and clutch drive ring 332 accurately set the clearances desired within clutch assembly 214 for its proper operation. Due to the commonization of components, the required thickness of spacers 347 are also known prior to the assembly of the unit 10 to the press, thus eliminating the need for custom fitting the assembly at the time of fitting it to the press. Thus, spacers 347 control the clearances between friction plates 302 and reaction plates 304 and these clearances determine the stroke required for the operation of clutch assembly 214. By selecting different thicknesses for spacers 347, the stroke of assembly 214 can be selected.

The modular and standard component design of brake and clutch unit 210 also provides for the pre-assembly testing of brake actuator assembly 254 and clutch actuator assembly 334 at the time of manufacture and not at the time of fitting of unit 210 to the press. This feature significantly reduces the time, complexity and costs associated with brake and clutch unit 210.

While the above detailed description describes the preferred embodiment of the present invention, it should be understood that the present invention is susceptible to modification, variation and alteration without deviating from the scope and fair meaning of the subjoined claims.

What is claimed is:

1. A combination oil shear clutch unit and brake unit;
   support means for securing said brake unit to a relatively non-rotatable member;
   shaft means for transmitting rotary motion;
   selectively operable brake means including a plurality of interleaved first friction disks for resisting rotation between said shaft means and said support means, said brake means being movable between an applied condition and a released condition;
   a brake biasing member for providing a first load for urging said brake means into said applied condition, said brake means defining a brake chamber for accepting a pressurized fluid to overcome said first load and move said brake means into said released condition;
   means for supporting said clutch unit in operative association with a flywheel;
   selectively operable clutch means including a plurality of interleaved second friction disks for operatively connecting said flywheel with said shaft means, said clutch means being movable between a disengaged condition and an engaged condition; and
   a clutch biasing member for providing a second load for urging said clutch means into said disengaged condition, said second load being generally equal to said first load, said clutch means defining a clutch chamber for accepting said pressurized fluid to overcome said second load and move said clutch means into said engaged condition, said clutch chamber having dimensions generally equal to said brake chamber, said clutch chamber being separate from said brake chamber.

2. A drive assembly for a press having a flywheel, a frame and a driveshaft, said drive assembly comprising:

an oil shear brake unit disposed on a first side of said flywheel, said oil shear brake unit comprising:

support means for securing said brake unit to said frame;

input means for receiving rotary motion from said driveshaft, said input means being rotatable with respect to said support means;

selectively operable brake means for prohibiting rotation of said input means, said brake means including a plurality of interleaved first friction disks alternately attached, respectively, to said support means and said input means;

a first biasing member for urging said brake unit from a released condition into an applied condition, said first biasing member exerting a first load for urging said brake unit into said applied condition;

an oil shear clutch unit disposed on a second side of said flywheel, said oil shear clutch unit comprising:

means for attaching said clutch unit to said flywheel;

output means for receiving rotary motion from said flywheel, said output means being secured to said driveshaft and rotatable with respect to said attaching means; and selectively operable clutch means for transmitting rotational motion of said attaching means to said output means, said clutch means including a plurality of interleaved second friction disks alternately attached, respectively, to said attaching means and said output means;

a second biasing member for urging said clutch unit from an engaged condition into a disengaged condition, said second biasing member exerting a second load for urging said clutch unit into said disengaged condition; and means for controlling the operational timing of said clutch unit and said brake unit such that a specified amount of overlap is provided between the release of said brake unit and the engagement of said clutch unit, said controlling means comprising said first load being different from said second load to produce said specified amount of overlap.

3. The drive assembly according to claim 2 wherein, said first biasing member includes a first plurality of springs, said second biasing member includes a second plurality of springs.

4. The drive assembly according to claim 2 wherein, said selectively operable brake means comprises a pre-assembled brake actuator assembly secured to said support means, said support means and said input means being adapted for mating with said frame and said driveshaft of said press, respectively.

5. The drive assembly according to claim 4 wherein, said selectively operable clutch means comprises a pre-assembled clutch actuator assembly secured to said attaching means, said attaching means and said output means being adapted for mating with said flywheel and said driveshaft of said press, respectively.

6. The drive assembly according to claim 2 wherein, said selectively operable clutch means comprises a pre-assembled clutch actuator assembly secured to said attaching means, said attaching means and said output means being adapted for mating with said flywheel and said driveshaft of said press, respectively.

7. The drive assembly according to claim 2 wherein said selectively operable brake means comprises a pre-assembled brake actuator assembly secured to said support means, said brake actuator assembly defining a brake stroke for moving said brake unit between a release condition and an applied condition, said brake stroke being adjustable.

8. The drive assembly according to claim 7 wherein said selectively operable clutch means comprises a pre-assembled clutch actuator assembly secured to said attaching means, said clutch actuator assembly defining a clutch stroke for moving said clutch unit between an engaged condition and a disengaged condition, said clutch stroke being adjustable.

9. The drive assembly according to claim 2 wherein said selectively operable clutch means comprises a pre-assembled clutch actuator assembly secured to said attaching means, said clutch actuator assembly defining a clutch stroke for moving said clutch unit between an engaged condition and a disengaged condition, said clutch stroke being adjustable.

10. The drive assembly according to claim 2 wherein said attaching means includes a housing defining a chamber having an outside portion and an inside portion, said plurality of interleave second friction disks being disposed within said outside portion, said oil shear clutch unit further comprising means for supplying oil for said oil shear clutch unit, said supplying means providing oil to said outside portion of said chamber and removing oil from said inside portion of said chamber.

11. The drive assembly according to claim 10 wherein said supplying means comprises a first oil passage extending through said housing for supplying said oil to said outside portion of said chamber and a second oil passage extending through said housing for removing said oil from said inside portion of said chamber.

12. A drive assembly for a press having a flywheel, a frame and a driveshaft, said drive assembly comprising:

an oil shear brake unit disposed on a first side of said flywheel, said oil shear brake unit comprising:

a brake adapter plate adapted for mating with said frame;

a brake housing secured to said brake adapter plate;

a brake hub adapted for mating with said driveshaft;

a plurality of interleaved brake friction plates alternately attached, respectively, to said brake housing and said brake hub;

a pre-assembled brake actuator assembly attached to said brake housing;

a first biasing member for urging said brake unit from a released condition into an applied condition, said first biasing member exerts a first load for urging said brake unit into said applied condition;

an oil shear clutch unit disposed on a second side of said flywheel, said oil shear clutch unit comprising:

a clutch adapter plate adapted for mating with said flywheel;

a clutch housing secured to said clutch adapter plate;

a clutch hub adapted for mating with said driveshaft; and a plurality of interleaved clutch friction plates alternately attached, respectively, to said clutch housing and said clutch hub; and a pre-assembled clutch actuator assembly attached to said clutch housing;

a second biasing member for urging said clutch unit from an engaged condition into a disengaged condition, said second biasing member exerts a second load for urging said clutch unit into said disengaged condition; and means for controlling the operational timing of said clutch unit and said brake unit such that a specified amount of overlap is provided between the release of said brake unit and the engagement of said clutch unit, said controlling means comprising said first load being different from said second load to produce said specified amount of overlap.

13. The drive assembly according to claim 12 wherein, said first biasing member includes a first plurality of springs, said second biasing member includes a second plurality of springs.

14. The drive assembly according to claim 12 wherein said brake actuator assembly defines a brake stroke for moving said brake unit between a released and an applied condition, said brake stroke being adjustable.

15. The drive assembly according to claim 14 wherein said clutch actuator assembly defines a clutch stroke for moving said clutch unit between an engaged and a disengaged condition, said clutch stroke being adjustable.

16. The drive assembly according to claim 12 wherein said clutch actuator assembly defines a clutch stroke for moving said clutch unit between an engaged and a disengaged condition, said clutch stroke being adjustable.

17. The drive assembly according to claim 12 wherein said clutch housing defines a chamber having an outside portion and an inside portion, said plurality of interleaved clutch friction plates being disposed within said outside portion, said oil shear clutch unit further comprising means for supplying oil for said oil shear clutch unit, said supplying means providing oil to said outside portion of said chamber and removing oil from said inside portion of said chamber.

18. The drive assembly according to claim 17 wherein said supplying means comprises a first oil passage extending through said clutch housing for supplying said oil to said outside portion of said chamber and a second oil passage extending through said clutch housing for removing said oil from said inside portion of said chamber.

19. An apparatus in combination with an oil shear clutch unit and an oil shear brake unit;

said oil shear brake unit being disposed on a first side of a flywheel of said apparatus, said oil shear brake unit comprising:

support means for securing said brake unit to a non-rotatable member of said apparatus;

input means for receiving rotary motion from said apparatus, said input means rotatable with respect to said support means;

selectively operable brake means for prohibiting rotation of said input means, said brake means including a plurality of interleaved first friction disks alternately splined, respectively, to said support means and said input means, said brake means being movable between an applied condition and a released condition;

a brake biasing member for providing a first load for urging said brake means into said applied condition, said brake means defining a brake chamber for accepting a pressurized fluid to overcome said first load and move said brake means into said released condition;

said oil shear clutch unit being disposed on a second side of said flywheel of said apparatus, said oil shear clutch unit comprising:

means for anchoring said clutch unit to said flywheel of said apparatus;

output means for receiving rotary motion from said flywheel, said output means rotatable with said input means of said oil shear brake unit;

selectively operable clutch means for transmitting rotational motion of said anchoring means to said output means of said oil shear clutch unit, said clutch means including a plurality of interleaved second friction disks alternately splined, respectively, to said anchoring means and said output means, said clutch means being movable between a disengaged condition and an engaged condition; and a clutch biasing member for providing a second load for urging said clutch means into said disengaged condition, said second load being generally equal to said first load, said clutch means defining a clutch chamber for accepting said pressurized fluid to overcome said second load and move said clutch means into said engaged condition, said clutch chamber having dimensions generally equal to said brake chamber, said clutch chamber being separate from said brake chamber.

20. A drive assembly for a press having a flywheel, a frame and a driveshaft, said drive assembly comprising:

an oil shear brake unit disposed on a first side of said flywheel, said oil shear brake unit comprising:

support means for securing said brake unit to said frame;

input means for receiving rotary motion from said driveshaft, said input means being rotatable with respect to said support means;

selectively operable brake means for prohibiting rotation of said input means, said brake means including a plurality of interleaved first friction disks alternately attached, respectively, to said support means and said input means;

a first biasing member for urging said brake unit from a released condition into an applied condition, said first biasing member exerting a first load for urging said brake unit into said applied condition;

an oil shear clutch unit disposed on a second side of said flywheel, said oil shear clutch unit comprising:

means for attaching said clutch unit to said flywheel;

output means for receiving rotary motion from said flywheel, said output means being secured to said driveshaft and rotatable with respect to said attaching means; and selectively operable clutch means for transmitting rotational motion of said attaching means to said output means, said clutch means including a plurality of interleaved second friction disks alternately attached, respectively, to said attaching means and said output means;

a second biasing member for urging said clutch unit from an engaged condition into a disengaged condition said second biasing member exerting a second load for urging said clutch unit into said disengaged condition; and means for controlling the operational timing of said clutch unit and said brake unit such that a specified amount of overlap is provided between the release of said brake unit and the engagement of said clutch unit, said controlling means comprising said first load being substantially the same as said second load such that said specified amount of overlap is substantially zero.

21. The drive assembly according to claim 20 wherein, said first biasing member includes a first plurality of springs and said second biasing member includes a second plurality of springs.

22. A drive assembly for a press having a flywheel, a frame and a driveshaft, said drive assembly comprising:
   an oil shear brake unit disposed on a first side of said flywheel, said oil shear brake unit comprising:
      a brake adapter plate adapted for mating with said frame;
      a brake housing secured to said brake adapter plate;
      a brake hub adapted for mating with said driveshaft;
      a plurality of interleaved brake friction plates alternately attached, respectively, to said brake housing and said brake hub;
      a pre-assembled brake actuator assembly attached to said brake housing;
   a first biasing member for urging said brake unit from a released condition into an applied condition, said first biasing member exerting a first load for urging said brake unit into said applied condition;
   an oil shear clutch unit disposed on a second side of said flywheel, said oil shear clutch unit comprising:
      a clutch adapter plate adapted for mating with said flywheel;
      a clutch housing secured to said clutch adapter plate;
      a clutch hub adapted for mating with said driveshaft; and
      a plurality of interleaved clutch friction plates alternately attached, respectively, to said clutch housing and said clutch hub; and
      a pre-assembled clutch actuator assembly attached to said clutch housing;
   a second biasing member for urging said clutch unit from an engaged condition into a disengaged condition, said second biasing member exerting a second load for urging said clutch unit into said disengaged condition; and
   means for controlling the operational timing of said clutch unit and said brake unit such that a specified amount of overlap is provided between the release of said brake unit and the engagement of said clutch unit, said controlling means comprising said first load being substantially the same as said second load such that said specified amount of overlap is substantially zero.

23. The drive assembly according to claim 22 wherein, said first biasing member includes a first plurality of springs, said second biasing member includes a second plurality of springs.

24. A drive assembly for a press having a flywheel, a frame and a driveshaft, said drive assembly comprising:
   an oil shear brake unit disposed on a first side of said flywheel, said oil shear brake unit comprising:
      support means for securing said brake unit to said frame;
      input means for receiving rotary motion from said driveshaft, said input means being rotatable with respect to said support means;
      selectively operable brake means for prohibiting rotation of said input means, said brake means including a plurality of interleaved first friction disks alternately attached, respectively, to said support means and said input means;
   an oil shear clutch unit disposed on a second side of said flywheel, said oil shear clutch unit comprising:
      means for attaching said clutch unit to said flywheel, said attaching means including a housing defining a chamber having an outside portion and an inside portion;
      output means for receiving rotary motion from said flywheel, said output means being secured to said driveshaft and rotatable with respect to said attaching means;
      selectively operable clutch means for transmitting rotational motion of said attaching means to said output means, said clutch means including a plurality of interleaved second friction disks alternately attached, respectively, to said attaching means and said output means, said plurality of interleave second friction disks being disposed within said outside portion of said chamber defined by said attaching means;
   means for producing oil flow through said chamber defined by said attaching means, said producing means providing oil to said outside portion of said chamber and removing oil from said inside portion of said chamber.

25. The drive assembly according to claim 24 wherein said supplying means comprises a first oil passage extending through said housing for supplying said oil to said outside portion of said chamber and a second oil passage extending through said housing for removing said oil from said inside portion of said chamber.

* * * * *